United States Patent
Kalajan

(10) Patent No.: US 7,293,099 B1
(45) Date of Patent: Nov. 6, 2007

(54) HETEROGENEOUS NETWORK FILE ACCESS

(75) Inventor: Kevin E. Kalajan, Redwood City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/163,246

(22) Filed: Sep. 29, 1998

(51) Int. Cl.
  *G06F 15/16* (2006.01)
(52) U.S. Cl. .................. 709/230; 709/203; 709/229; 709/219
(58) Field of Classification Search ........... 709/227, 709/237, 224, 217, 232, 243, 246, 203, 219, 709/229, 230
  See application file for complete search history.

(56) References Cited

U.S. PATENT DOCUMENTS

| | | | | |
|---|---|---|---|---|
| 5,077,655 A | * | 12/1991 | Jinzaki ................... | 709/237 |
| 5,754,830 A | * | 5/1998 | Butts et al. ............. | 370/466 |
| 5,764,916 A | * | 6/1998 | Busey et al. ............ | 709/227 |
| 5,764,918 A | * | 6/1998 | Poulter .................. | 358/1.15 |
| 5,790,800 A | * | 8/1998 | Gauvin et al. .......... | 709/203 |
| 5,805,803 A | * | 9/1998 | Birrell et al. ........... | 726/12 |
| 5,826,017 A | * | 10/1998 | Holzmann ............... | 709/230 |
| 5,903,754 A | * | 5/1999 | Pearson .................. | 719/310 |
| 5,974,449 A | * | 10/1999 | Chang et al. ............ | 709/206 |
| 5,996,022 A | * | 11/1999 | Krueger et al. .......... | 709/247 |
| 6,081,814 A | * | 6/2000 | Mangat et al. .......... | 715/501.1 |
| 6,105,068 A | * | 8/2000 | Naudus ................... | 709/228 |
| 6,185,616 B1 | * | 2/2001 | Namma et al. .......... | 709/227 |
| 6,253,254 B1 | * | 6/2001 | Erlenkoetter et al. .... | 719/316 |
| 6,321,258 B1 | * | 11/2001 | Stollfus et al. .......... | 709/220 |
| 6,356,934 B1 | * | 3/2002 | Delph .................... | 709/204 |
| 6,832,256 B1 | * | 12/2004 | Toga ...................... | 709/229 |

OTHER PUBLICATIONS

Pall, Gurdeep Singh et al.; "Point-to-Point Tunneling Protocol (PPTP) Technical Specification"; Feb. 22, 1996; http://hooah.com/workshop/prog/prog-gen/pptp.htm.

* cited by examiner

*Primary Examiner*—Ario Etienne
*Assistant Examiner*—Barbara Burgess
(74) *Attorney, Agent, or Firm*—Bobby K. Truong; Hickman Palermo Truong & Beckert LLP

(57) ABSTRACT

A method for a client to access data files residing on a first data server through a network includes coupling a heterogenous proxy server to the first data server through a first local network protocol, selectively receiving at the heterogeneous proxy server a data file from the first data servers by employing the first local network protocol, translating the data file into a format compatible with transmission through the network, and transmitting the translated data file to the client across the network.

63 Claims, 8 Drawing Sheets

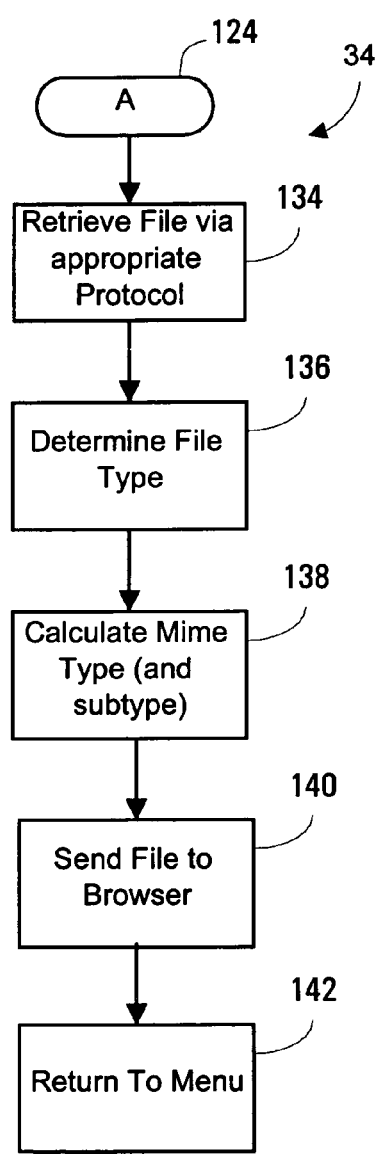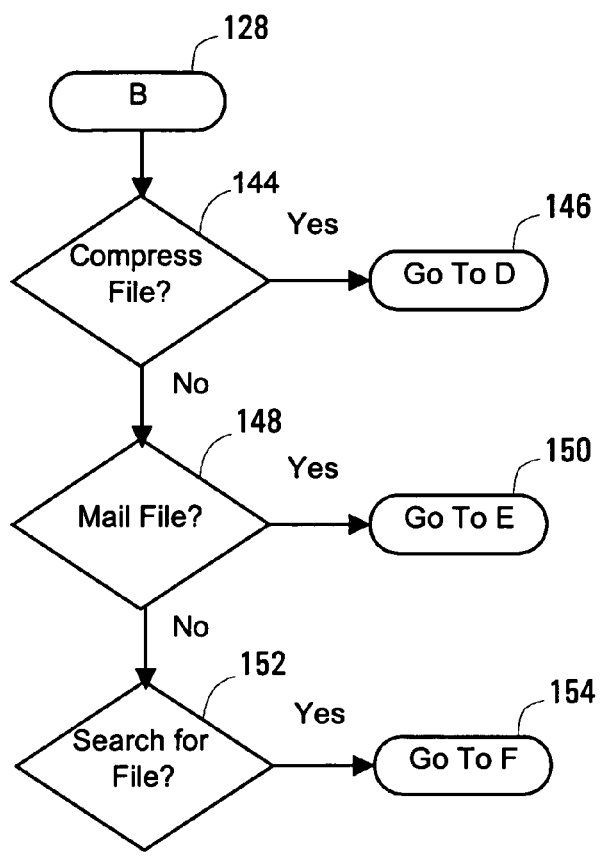

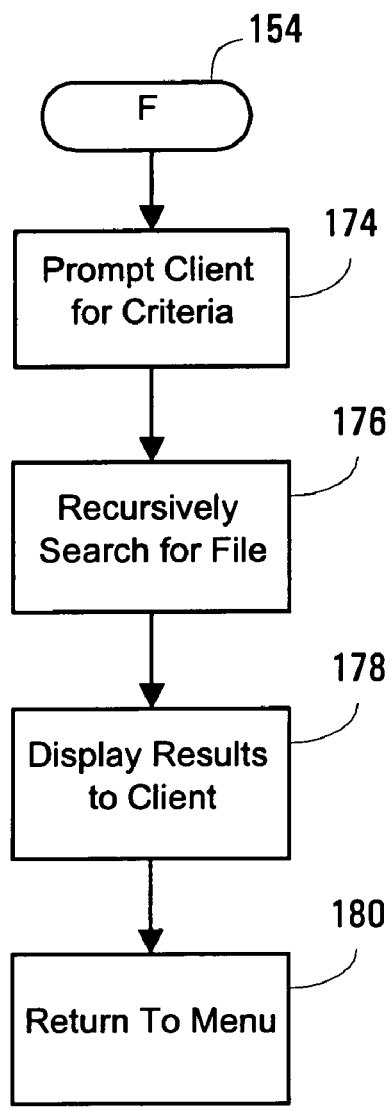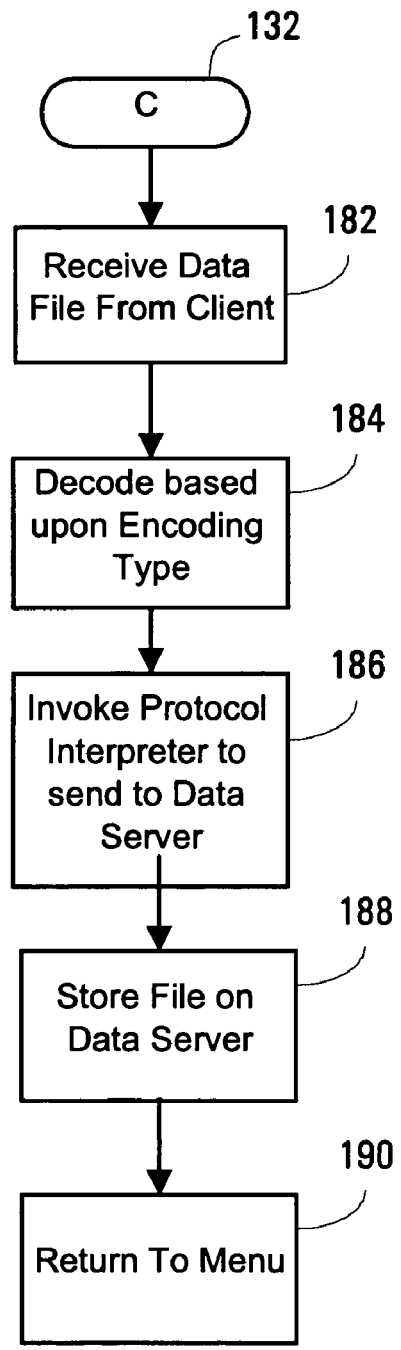

HETEROGENEOUS NETWORK FILE ACCESS

BACKGROUND

The present invention relates generally to electronic communications.

During communication sessions in data networks, clients typically request information provided by servers. Increasingly, clients seek information located on different servers, coupled to networks having different data encoding and file transport protocols. For example, a user in an organization using one computer (e.g., a windows-based machine), might seek to access data on another windows-based machine coupled to a local area network (LAN) running Novell NetWare, as well as data on a Unix-based machine, located on a LAN running Unix/NFS (Network File System), as well as data residing on an Apple Macintosh machine, located on a LAN running AppleTalk.

One method for allowing such access requires development of a software application which both connects the two machines (the local client and the destination server) as well performs all the translations in both data encoding and file transport at both ends of the communication link. Such a program, installed and running at both ends of the communication link, can translate the client's network protocols into the proper file access protocols for the server's network, and then retrieve the desired file, while translating the file's data from its original format into a format usable by the client. Each such connection between different types of client and server environments typically requires separate network and data translation schemes. In addition, such software applications must typically reside at the network layer 3, and be installed into the kernel of the operating system of both the client and the server. Therefore, for a number of clients to communicate with a given server, such translation/communication applications typically requires configuration and installation into each client's operating system.

"Tunneling" typically allows redirection of network drives, where a file received in one network protocol (e.g., NFS, Windows Networking (SMB) is typically encrypted within another layer of redirection (the "tunnel"). Generally, tunneling is also implemented at the operating system kernel and is platform specific.

Web browsers can be used to initiate file transfers (e.g., with an "ftp://<url>" nomenclature), but this only allows file transfers from a machine residing on the Internet.

SUMMARY

In general, in one aspect, the invention features a method for a client to access data files residing on a first data server through a network, the method including coupling a heterogenous proxy server to the first data server through a first local network protocol, receiving at the heterogeneous proxy server a data file from the first data server by employing the first network protocol, translating the data file into a format compatible with transmission through the network, and transmitting the translated data file to the client across the network.

Embodiments of the invention may include one or more of the following features. A request can be sent from the client to the heterogeneous proxy server that the data file be received from the first data server and then sent to the client. The heterogenous proxy server can be coupled to a second data server through a second local network protocol, the first and second local network protocols being different, and the heterogeneous proxy server can selectively receive a data file from at least one of the first or the second data servers by employing the respective first or second local network protocols, can translate the data file into a format compatible with transmission through the network, and transmit the translated data file to the client across the network. The network can employ Transmission Control Protocol (TCP). The format compatible with transmission through the network can be HyperText Transport Protocol (HTTP). The format compatible with transmission through the network can be a Multipurpose Internet Mail Extension (MIME) of HTTP. The first and second local network protocols can each comprise one of the following: Windows Networking (SMB), File Transport Protocol (FTP), Network File System (NFS), IPX/NCP (Novell Core Protocol), Banyan VINES, DECNet, and AppleTalk. The client can employ an HTTP browser for connecting to the heterogeneous proxy server. File management and downloading services can be accomplished using an HTML document (or web page) containing information from the heterogeneous proxy server regarding available data files on data servers and providing the client with appropriate selections, including allowing the client to send a request for the data file to the heterogeneous proxy server. Or the client can download an applet executable by the HTTP browser, the applet being configured to receive information from the heterogeneous proxy server regarding available data files on the data servers, and to send a request for the data file to the heterogeneous proxy server. The applet, upon receiving the data file, can initiate an appropriate application for using the data file. The data file can be compressed at the heterogeneous proxy server before the data file is transmitted to the client. The data file can be e-mailed from the heterogeneous proxy server to an e-mail recipient, without transmitting the data file to the client. The heterogeneous proxy server can search for the data file at one or more data servers. The client can be authenticated before connecting the client to the heterogeneous proxy server.

In general, in another aspect, the invention features a method for a client to access data files residing on at least a first and a second data server through a network, wherein the network employs Transport Control Protocol (TCP), the method including coupling a heterogenous proxy server to the first data server through a first local network protocol, and to the second data server through a second local network protocol, the first and second local network protocols being different, sending a request from the client to the heterogeneous proxy server that the data file be received from the first or second data servers and then sent to the client, wherein the client employs an HTTP browser for connecting to the heterogeneous proxy server, selectively receiving at the heterogeneous proxy server a data file from at least one of the first or the second data servers by employing the respective first or second local network protocols, translating the data file into a format compatible with transmission through the network, comprising HyperText Transport Protocol (HTTP), and transmitting the translated data file to the client across the network.

In general, in another aspect, the invention features a storage device tangibly storing a control program, the control program, when coupled to a control device, operating the control device to allow a client to access data files residing on a first data server through a network, the control program being configured to operate the control device to perform the functions of coupling a heterogenous proxy server to the first data server through a first local network protocol, selectively receiving at the heterogeneous proxy server a data file from the first data server by employing the respective first local network protocols, translating the data file into a format compatible with transmission through the network, and transmitting the translated data file to the client across the network.

Advantages of the invention may include one or more of the following. A number of clients can connect to a heterogeneous proxy server and gain access to files located on a number of different network platforms. A client can use a common web browser to connect to the heterogeneous proxy server without special software in order to gain such access. Moreover, heterogeneous clients using different computer platforms (such as PCS, Unix machines or Macintoshes) can access data on any number of different servers, if the heterogeneous proxy server has an appropriate protocol interpreter. No special translation software is required at either the client or the target server having a desired file—all translation occurs at the heterogeneous proxy server. Each user can seamlessly and transparently retrieve a file, regardless of its native network format or location, remotely retrieve it across the Internet, and have their local web browser automatically detect the type of file retrieved, load an appropriate application, and then display the file to the user. Upon completing operations with the file, the user can close and save it, and the web browser can be configured to send the file back to a destination data server (which can be different from the original source data server), and the file, before further transmission and storage at the destination, can be retranslated by the heterogeneous proxy server into the network format native to the destination.

Calculation and time intensive operations upon files (such as compression and searching) can be conducted by the heterogeneous proxy server, leaving relatively lower bandwidth operations (such as list and file transfers) to the connection between client and heterogeneous proxy server. Network traffic between client and heterogeneous proxy server can be automatically encrypted by SSL using HTTP/S, incorporated in newer web browser applications, and compressed by any compression schemes easily decoded via a browser or associated helper applications. An administrative application can be coupled or embodied in a heterogeneous proxy application in order to capture, record, and tabulate operations such as user accesses and server and file accesses. The administrative application can thereby keep a detailed logging and accounting of this usage data for security monitoring and capacity planning. Furthermore, a detailed logging of all Internet-based remote accesses can simplify such data collection, as opposed to recording and retrieving such data at each separate network data server being accessed.

These and other features and advantages of the present invention will become more apparent from the following description, drawings, and claims.

DRAWINGS

FIGS. 3a through 3h are flow charts illustrating the operation of a heterogeneous proxy application.

DESCRIPTION

Figure 1:
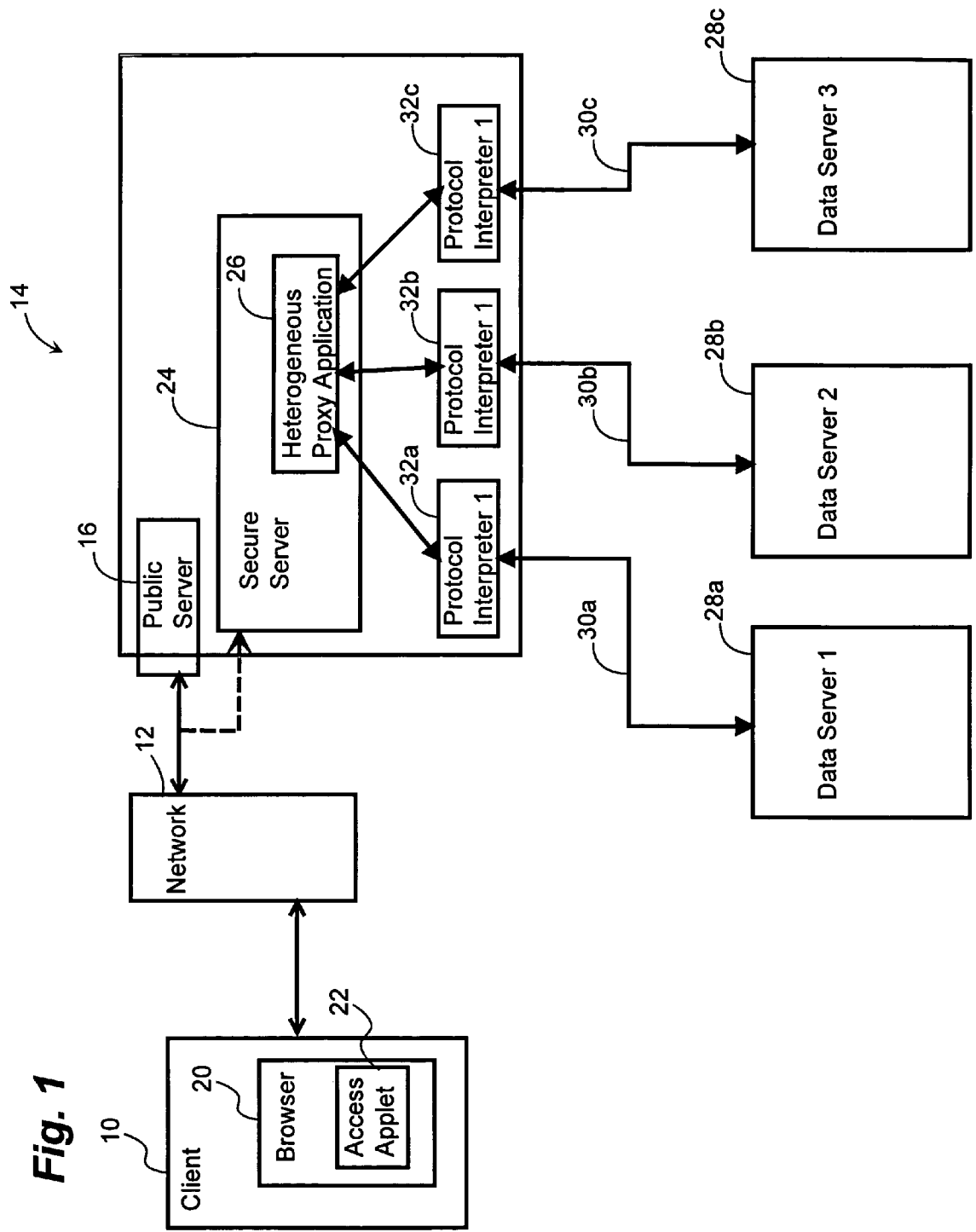
FIG. 1 is a schematic diagram of a network providing a heterogeneous proxy server and application.

As shown in FIG. 1, a client 10 connects across a network 12 to a heterogenous proxy server system 14, initially through a public server 16. In a preferred embodiment, network 12 is an IP-compliant network (e.g., the Internet), and client 10 connects to public server 16 via HTTP using a "web" browser 20. However, the methods and apparatus described below can be used within other networks 12, using other network protocols and communication applications.

An access applet 22 can be downloaded from public server 16 and executed at client 10. The applet can be an ActiveX or Java-based access applet 22 executed by browser 20. Access applet 22, in conjunction with public server 16, can perform optional authentication procedures upon client 10, which, if successful, connect client 10 to secure server 24. Alternatively, instead of a downloaded access applet, a user interface for performing functions with heterogeneous proxy server system 14 can be provided by other front end applications at the heterogeneous proxy server system 14. For example, an HTML web page sent by either public server 16 or private server 24 to client 10 can allow for user selection of any or all of the functions described below, without downloading any higher level software.

Heterogeneous proxy application 26, running on secure server 24, can connect client 10 with data files residing on one or more data servers 28a, 28b, and 28c coupled to one or more different networks 30a, 30b, and 30c. For example, first data server 28a can be coupled to secure server 24 via a Windows NT network 30a, while second data server 28b can be coupled to secure server 24 via a Novell NetWare network 30b, and while third data server 28c can be coupled to secure server 24 via a Unix/NFS network 30c.

Heterogeneous proxy application 26 uses one or more protocol interpreters 32a, 32b, and 32c to communicate with respective data servers 28a, 28b, and 28c on respective networks 30a, 30b, and 30c. Protocol interpreters 32a, 32b, and 32c can reside within heterogeneous proxy application 26, or be separate modules accessible by heterogeneous proxy application. These protocol interpreters 32 may be installed into the kernel of the secure server 24 (or more generally any server machine which is part of heterogeneous proxy server 14). Protocol interpreters 32 provide networked access to files. In some cases protocol interpreters 32 can implement high-level file transfer protocols (e.g. FTP) and in other cases implement kernel-based drive/directory redirection protocols (e.g. NFS or Novell/IPX/NCP).

Figure 2:
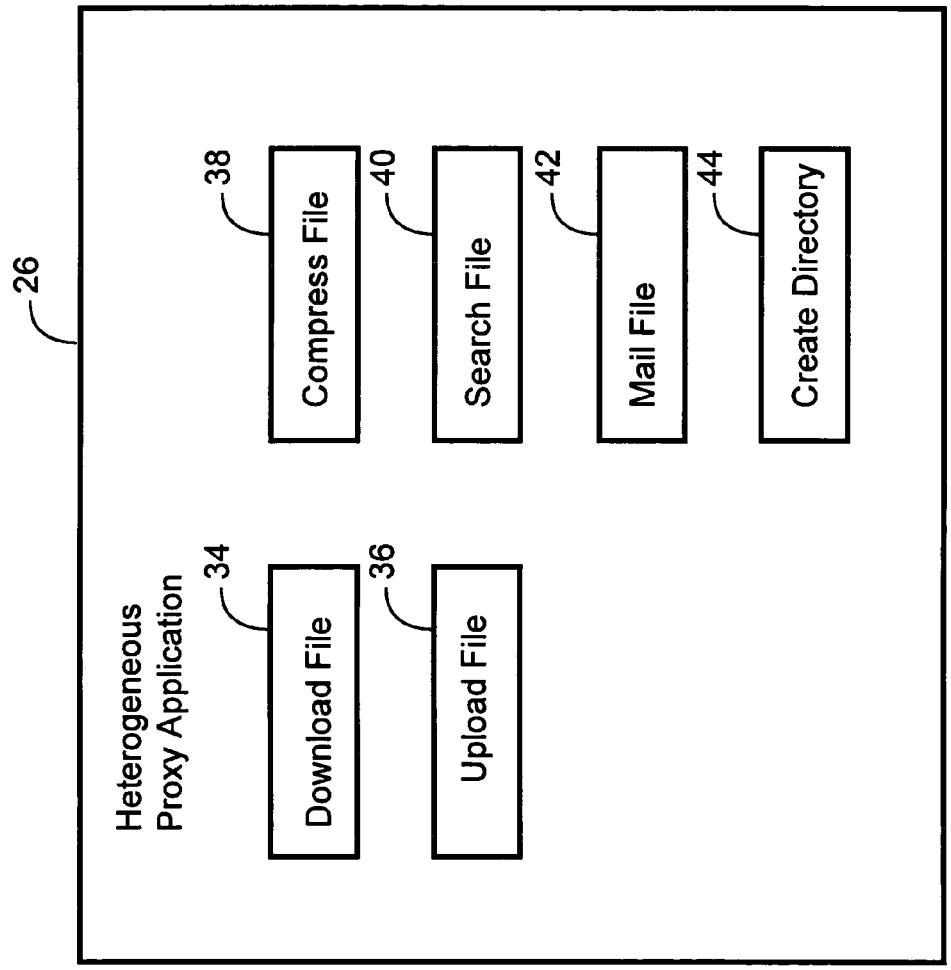
FIG. 2 is a functional block diagram of a heterogeneous proxy application.
Figure 3A:
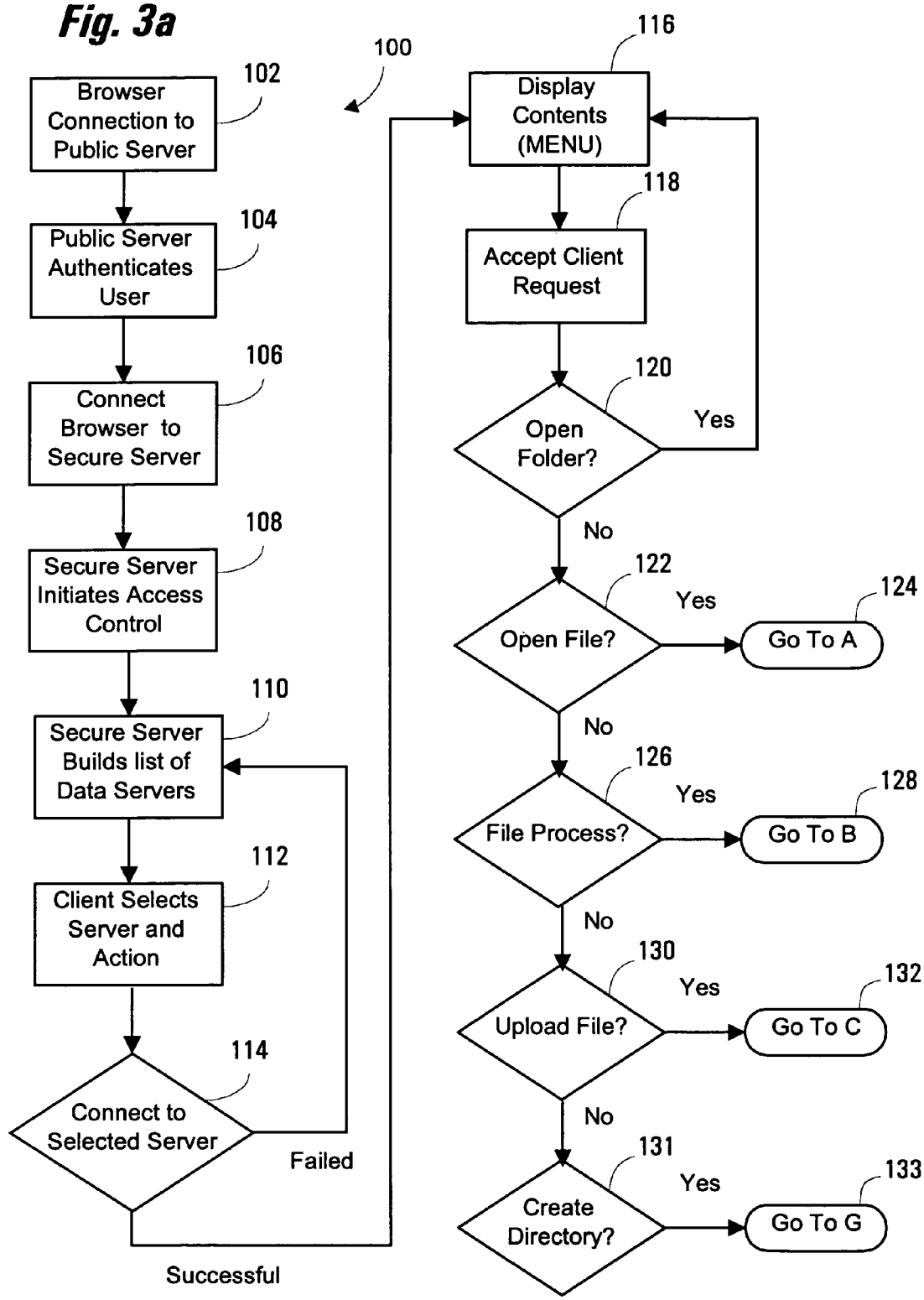
Figure 3D:
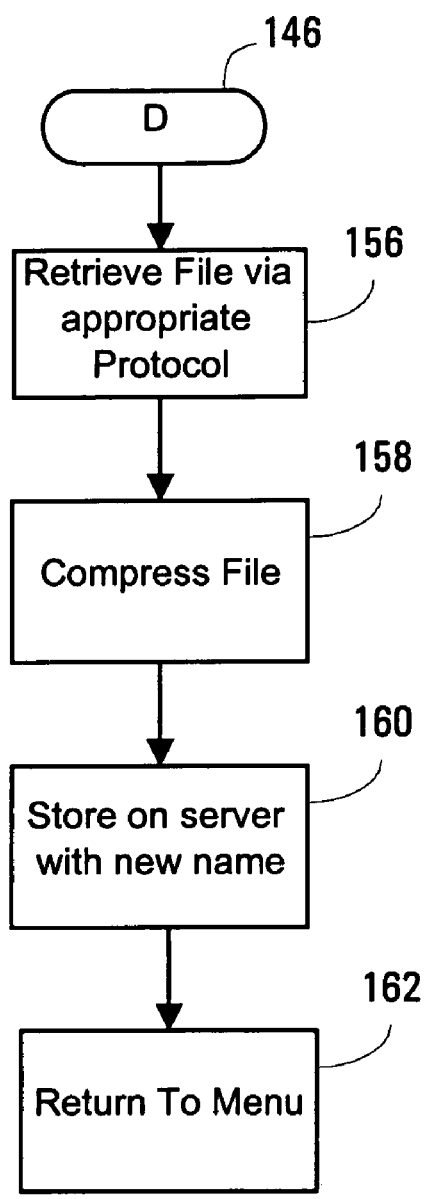
Figure 3E:
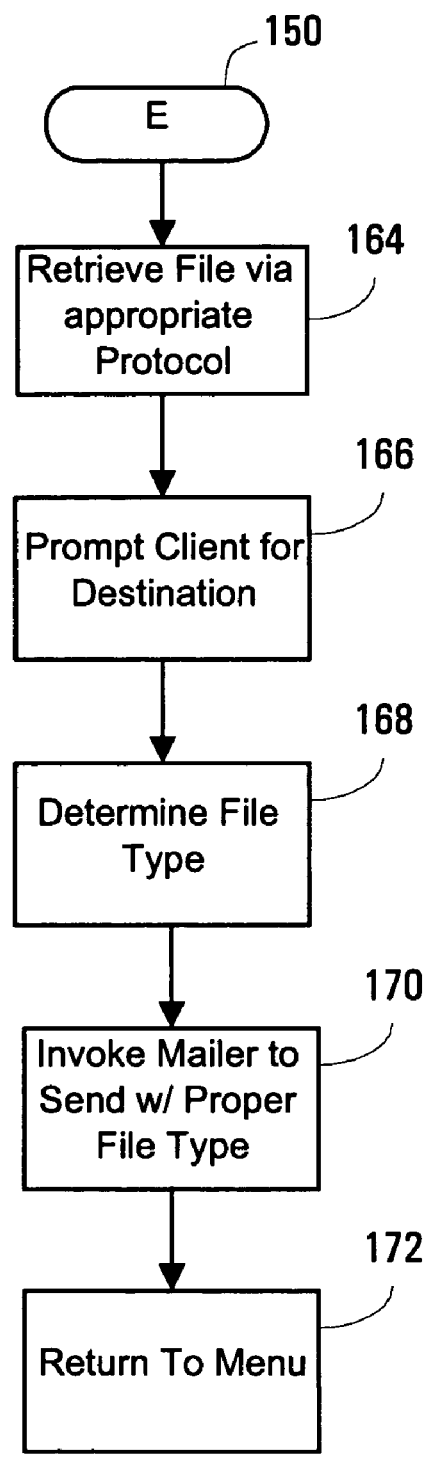
Figure 3H:
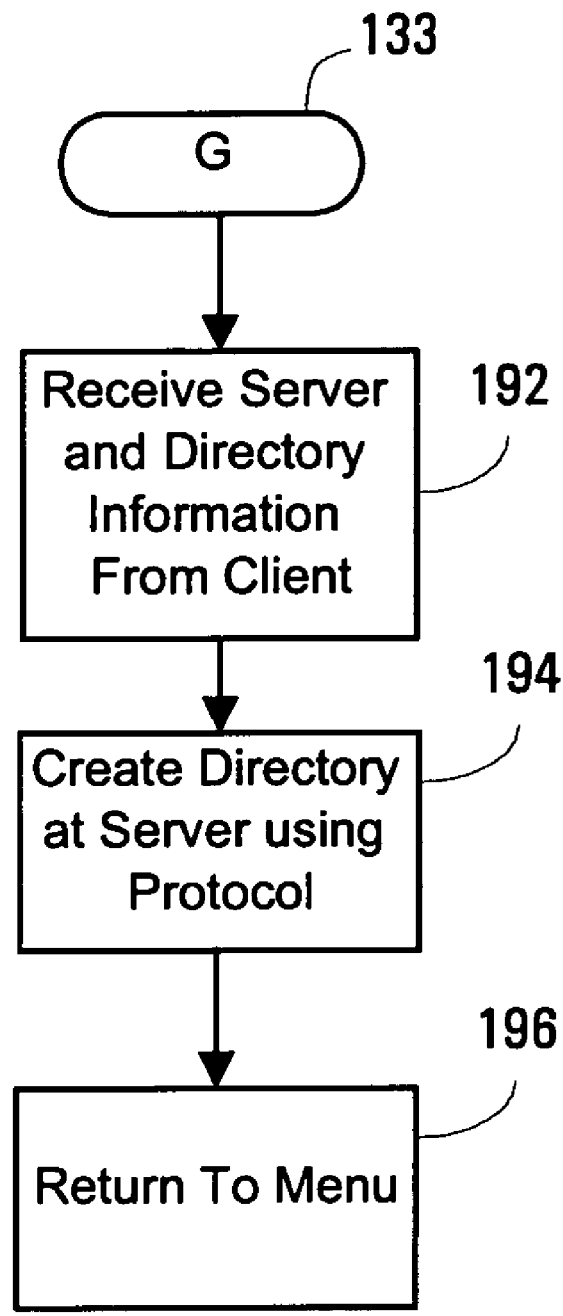

As shown in FIG. 2, heterogeneous proxy application 26 includes a download file module 34, an upload file module 36, a compress file module 38, a search file module 40, a mail file module 42, and a create directory module 44. Download file module 34 enables client 10 to select and retrieve a file from a selected data server 28 on a network 30, through network 12, to the client 10. Upload file module 36 allows a reverse operation: client 10 can transfer a file from itself through network 12 to a selected data server 28 on a respective network 30.

Compress file module 38 allows heterogeneous proxy server 14 to compress a selected file locally before further operations (such as downloading or e-mailing). Search file module 40 allows client 10 to search directories on one or more of the supported, attached data servers 28 in order to find and select a file. Mail file module 42 allows a client to e-mail a selected file directly from heterogeneous proxy server system 14, without first downloading the file to client 10 and then e-mailing it. Create directory module 44 allows a client 10 to create a file directory on any of the supported, attached data servers 28 in order to store one or more files.

As shown in FIGS. 3a through 3h, a heterogeneous proxy server method 100 typically begins with client 10 connecting to public server 16 via web browser 20 (step 102). Client 10 can access a user interface web page, download access applet 22 at this time, have access applet 22 already preinstalled, or can download access applet 22 after being properly authenticated as a legitimate client (step 104). For example, traveling employees could simply connect to their company's public web page, log onto a file access web page, or download access applet 22, and begin an authentication and file retrieval session, without requiring anything but a readily available web browser, and without making any changes to the operating system of client 10.

Once client 10 is properly authenticated, it is connected to secure server 24 (step 106). Secure server 24 can then initiate additional access control methods (step 108). One example of such methods is given in co-pending application Ser. No. 08/928,360, filed Sep. 12, 1997, entitled "Remote Access-Controlled Communication", incorporated herein by reference. Such methods can provide further levels of secure access for external clients 10 to sensitive data residing on secure server 24 and data servers 28.

Once client 10 has the requisite access, secure server 24 builds and transmits to client 10 a list of available data servers 28 coupled to secure server 24 (step 110). The list can be compiled from, e.g., a local host file, a DNS server for TCP/IP data server hosts, from a Windows Name Server for data servers 28 coupled through a Windows Networking protocol, from a Novell NDS or Novell Bindery for data servers coupled through NetWare, or through comparable processes or data structures for DECNET or Banyan VINES-based servers. This list can be built and stored in advance, rather than be constructed on the fly, although pre-built lists can yield errors when, e.g., a data server is no longer connected due to a network fault. Access applet 22 can present to client 10 the built list of available data servers 28, preferably in a convenient form, such as a typical graphical interface file manager window.

One method for building a list of available data servers 28 begins by querying the local public server 16 and secure server 24 (e.g., primary domain controller and the local domain-name servers) to list all hosts that are in the current domain. Also, each connected Windows name server can be queried for all known Windows-based hosts along with the respective workgroups. Further, each Novell bindery or NDS tree can be queried for all respective Novell hosts. Other data servers coupled through other network protocols can be queried similarly. Each of the results of these queries are stored in a local host file accessible by heterogeneous proxy application 26, which can sort the list and remove any duplicates.

Once client 10 receives the list of available servers, the user of client 10 can select a given server and provide a given action (step 112). For example, client 10 can, again through a GUI, allow a user to mouse click a given icon for a data server 28, indicating that the user would like to open that data server 28 and browse its directory and file contents. The access applet 22 can optionally require an additional password at this (or any other) point to grant the user access to the selected resource. Another option is that the user can query the secure server for a list of available network resources.

Upon receipt of the client request, secure server 24 attempts to connect to the requested data server 28 (step 114). Connections are made through respective network protocol interpreters 32. Thus, secure server 24 appears to a respective data server 28 as a fully compatible network peer. For instance, if data on a Unix/NFS data server 28b is desired, second protocol interpreter 32b is employed to control transfer of data to and from second data server 28b, and cause secure server 24 to appear like a Unix/NFS client to data server 28b. If the connection attempt fails for any reason, control returns to step 110 and secure server 24 attempts to build a new correct list of available data servers and an appropriate message is transferred across network 12 (e.g., using HTTP) to client 10 that the selected resource is unavailable.

If the connection is successful, client 10 receives a listing of contents of the selected data server 28, e.g., in a graphical interface file manager type list of directories and files (step 116 (this step is also referred to as "Menu" for recursive returns during method 100)). Access applet 22 can handle all such displays of information, and can capture user requests at client 10. The user of client 10, referring to the displayed contents of data server 28, can make further requests and take further actions, e.g., through mouse clicks and keyboard data entry. Such requests are transferred over network 12 and accepted by heterogeneous proxy application 26 on secure server 24 (step 118).

If the accepted request is to open a displayed folder (step 120), control then returns Menu (step 116), and heterogeneous proxy application 26 descends one level down the folder hierarchy of the current data server 28, generates a new list of folders and files, and then sends this new list over network 12 to client 10 for display to the user.

If the accepted request is to open a displayed file (step 122), control transfers to the download file module 34 (Go to A in FIG. 3b, step 124). First, the requested file is retrieved from, e.g., data server 28a via the appropriate protocol interpreter 32a over respective network 30a (step 134). Second, the file type, e.g., text, gif, jpeg, or other is determined (step 136). Third, an appropriate Multipurpose Internet Mail Extension (MIME) type and subtype are calculated from the file type, in order to send the file to client 10 over network 12 as an e-mailed file with an appropriate content type. If the file is simply ASCII or text (including program source code), it can be sent as content/type="text/plain". If the file is an image file (JPEG, GIF, etc.), then it can be sent as "image/<image type>". If the file type is "other", the file extension of the file is used to look up a corresponding MIME type for that extension, and the file can be sent with information specifying application/file extension information. That is, if no MIME type is found, then the file is sent as "application/<extension>". If there is no file extension, the file can be sent in a customizable mime type configuration as "application/octet-stream". The file is then sent via network 12 to browser 20 at client 10 (step 140), and operation returns to Menu (step 142).

As an example, client 10 can be a Macintosh computer employing a Macintosh-compatible web browser such as Netscape Navigator, and can be requesting a Microsoft Word document having a file extension ".doc" located on a Windows NT data server 28. Heterogeneous proxy application 28 retrieves the Word file using a Windows NT protocol interpreter 32 across the Windows NT network, determines that it is a Word text document having a ".doc" file extension, and transmits a proper MIME file via HTTP over network 12 (the Internet) to client 10. Upon receipt of the file, web browser 20 (or access applet 22) automatically translates the MIME document into a proper Macintosh-formatted Word file (since web browser 20 has already been configured to handle Macintosh files), and opens the Word file using a Macintosh-compliant Word Program (if available). This depends upon transferring the file with the proper MIME type and subtype so that browser 20 can open it properly. All of these activities appear seamless to the user of client 10.

If the client request is a file processing command (or a "High IQ" command) (step 126), control transfers (Go to B in FIG. 3c, step 128) to one of several commands. If the client request is a compress file command (step 144), then control passes to the compress file module 38 (go to D in FIG. 3d, step 146) and a selected file is retrieved from the selected data server 28 as set forth above (step 156). Heterogeneous proxy application 26 then compresses the file (step 158), and the file is then stored (e.g., locally at the secure server 24, on the original data server 28, or elsewhere) with a new name (step 160). Storing the compressed file allows for retransmission of the compressed file should communication with either client 10 or an e-mail destination fail. Once compression is complete, control returns to Menu (step 162).

If the client request is a mail file command (step 148), then control passes to the mail file module 42 (Go to E in FIG. 3e, step 150) and a selected file is retrieved from the selected data server 28 as set forth above (step 164). Heterogeneous proxy application 26 then prompts client 10 for a destination to e-mail the file (step 166), and determines the file type (step 168). Depending upon file type, the file is sent by invoking a Mailer routine to send the file to a requested destination with the proper file type (step 170). For example, if the file is simple ASCII, then it can be sent as an e-mail text file in the main body of the e-mail message. If it is binary, then the file can be encoded using Base64, made into an e-mail attachment, the user can be queried for proper addressees (including, e.g., any cc's, or bcc's, reply to, and other header fields), and then the properly addressed file can be sent. Once the file has been sent, control returns to Menu (step 172). Compression and mailing of a selected file can optionally be combined into a single command, such as "compress and send", which would combine the two sets of procedures.

If the client request is a search for file command (step 152), then control passes to the search file module 40 (Go to F in FIG. 3f, step 154) and client 10 is prompted for conventional search criteria such as text strings, wild cards, and/or boolean operations (step 174). Directories on a selected data server (or servers) are recursively searched to locate all matching files (step 176). This searching is conducted through commands from heterogeneous proxy application, translated and mediated by one or more of the appropriate protocol interpreters 32. Results of the search are compiled and then relayed via HTTP across network 12 for display to the user of client 10 (step 178). Again, control returns to Menu (step 180).

Referring again to FIG. 3a, if the client request is to upload a file from client 10 to a selected data server 28 (step 130), then control passes to the upload file module 36 (Go to C in FIG. 3g, step 132) and heterogeneous proxy application 26 receives the data file from client 10 via HTTP across network 10 (step 182). The received file is decoded based upon its encoding type (step 184). That is, Macintosh files are decoded from Binhex, Windows 95 files are decoded from Base64, and Unix files are decoded from Uuencode. Then, the appropriate protocol interpreter 32 is invoked to transfer the uploaded and decoded file to a selected folder and filename on the respective selected data server 28 (step 186), where the file is then appropriately stored (step 188). At the conclusion of the file upload procedure, control again returns to Menu (step 190).

Referring again to FIG. 3a, if the client request is to create a directory at a selected data server 28 (step 131), then control passes to the create directory module 44 (Go to G in FIG. 3h, step 133) and heterogeneous proxy application 26 receives the server and directory information from client 10 via HTTP across network 10 (step 192). The received information is then used to create the appropriate directory at the selected data server 28 using the appropriate protocol interpreter 32 (step 194). At the conclusion of the create directory procedure, control again returns to Menu (step 196).

Figure 4:
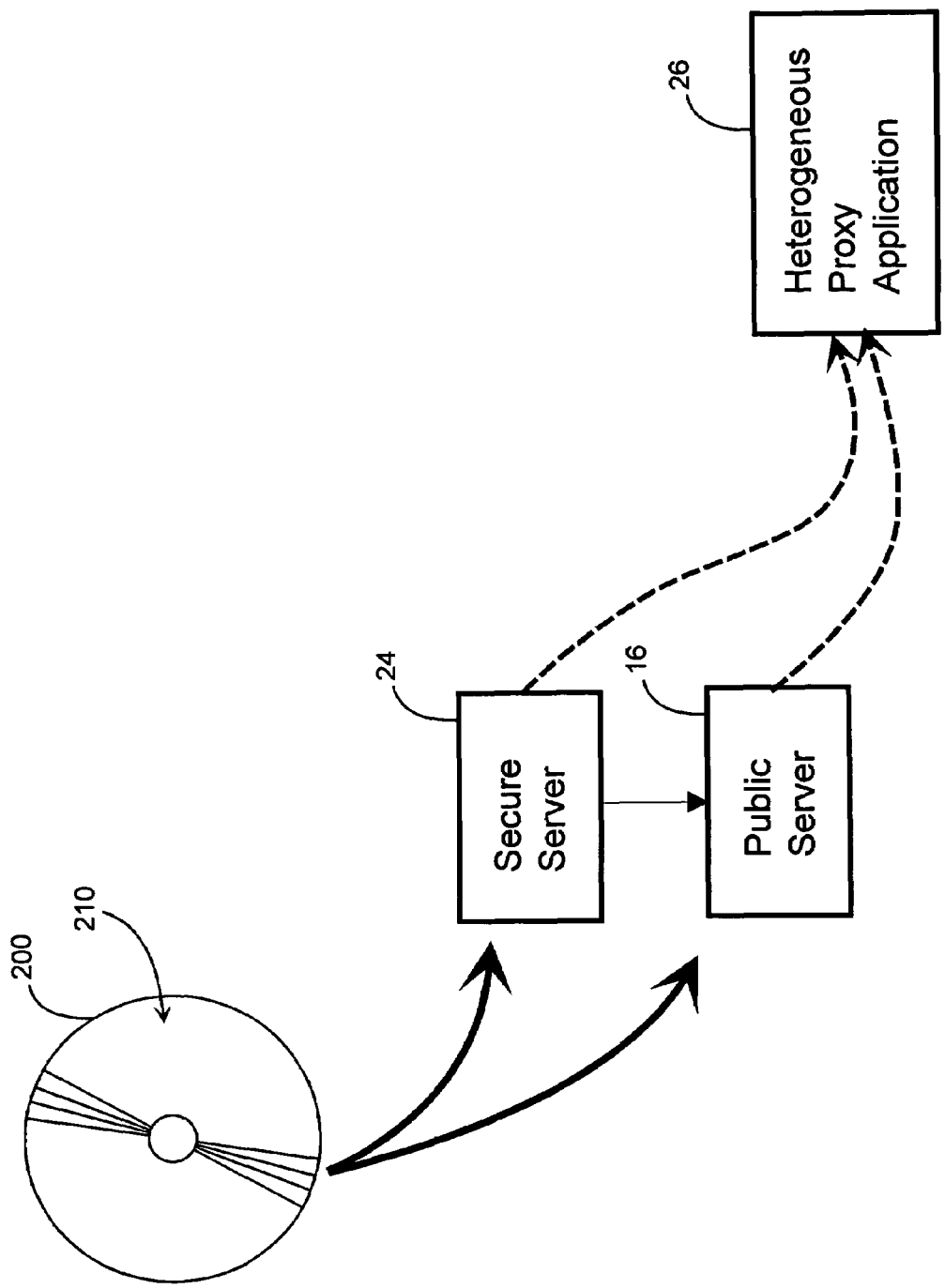
FIG. 4 is a heterogeneous proxy application stored on a machine-readable device.

Referring to FIG. 4, computer program 210 (comprising executable instructions) can be placed upon any machine-readable device 200, such as a floppy disk, CD-ROM, removable hard drive, or other memory device, and can then be loaded into secure server 24. Computer program 210 can include instructions which, when loaded into secure server 24 (or any other servers, including public server 16), provides the application software needed to generate an appropriate heterogeneous proxy application 26 to provide a heterogeneous proxy system 14.

Other embodiments are within the scope of the claims. For example, the network 12 can be any electronic communication medium. Client 10 and heterogeneous proxy server system 14 can use any available electronic communication protocol and interfaces. Data servers 28 can be connected to heterogeneous proxy server system 14 through any available network protocol or system, including wireless radio and infrared networks. Any software applications at the client and server can be implemented in software code executed by one or more general purpose computers, in firmware, or in special-purpose hardware. Heterogeneous proxy application can include one or more of the specific modules 34 through 44 described above, and other modules for performing additional functions with data files received from a data server 28.

What is claimed is:

1. A method implemented by a server, comprising:
receiving a request from a first client to browse contents of a first file system on a first data server, wherein the first data server implements the first file system for managing file access and storage, and wherein the first client is unaware that the first data server implements the first file system;
selecting a first protocol interpreter from a plurality of different protocol interpreters, wherein the first protocol interpreter implements a first file access protocol which enables interaction with the first file system;
invoking the first protocol interpreter to interact with the first file system of the first data sever to obtain therefrom a first list of contents, wherein the first list of contents sets forth a hierarchical listing of at least a portion of the contents of the first file system on the first data server, the first list of contents comprising one or more directories and zero or more files; and
sending at least a portion of the first list of contents to the first client.

2. The method of claim 1, wherein the first client executes a web browser and submits the request using the web browser.

3. The method of claim 1, wherein the first client does not implement the first file access protocol such that the first client is incapable of interacting directly with the first file system.

4. The method of claim 1, further comprising:
receiving a request from the first client to browse contents of a second file system on a second data server, wherein the second data server implements the second file system, different from the first file system, for managing file access and storage, and wherein the first client is unaware that the second data server implements the second file system;
selecting a second protocol interpreter from the plurality of different protocol interpreters, wherein the second protocol interpreter implements a second file access protocol which enables interaction with the second file system;
invoking the second protocol interpreter to interact with the second file system of the second data sever to obtain therefrom a second list of contents, wherein the second list of contents sets forth a hierarchical listing of at least a portion of the contents of the second file system on the second data server, the second list of contents comprising one or more directories and zero or more files; and
sending at least a portion of the second list of contents to the first client.

5. The method of claim 4, wherein the first client does not implement the second file access protocol such that the first client is incapable of interacting directly with the second file system.

6. The method of claim 1, further comprising:
receiving a request from a second client to browse contents of a second file system on a second data server, wherein the second data server implements the second file system, different from the first file system, for managing file access and storage, and wherein the second client is unaware that the second data server implements the second file system;
selecting a second protocol interpreter from the plurality of different protocol interpreters, wherein the second protocol interpreter implements a second file access protocol which enables interaction with the second file system;
invoking the second protocol interpreter to interact with the second file system of the second data sever to obtain therefrom a second list of contents, wherein the second list of contents sets forth a hierarchical listing of at least a portion of the contents of the second file system on the second data server, the second list of contents comprising one or more directories and zero or more files; and
sending at least a portion of the second list of contents to the second client.

7. The method of claim 6, wherein the second client does not implement the second file access protocol such that the second client is incapable of interacting directly with the second file system.

8. The method of claim 1, further comprising:
receiving a request from the first client to further explore a particular directory on the first data server;
invoking the first protocol interpreter to interact with the first file system of the first data sever to obtain therefrom a second list of contents, wherein the second list of contents comprises zero or more directories and one or more files stored within the particular directory; and
sending at least a portion of the second list of contents to the first client.

9. The method of claim 1, further comprising:
receiving a request from the first client to access a particular file stored on the first data server;
invoking the first protocol interpreter to interact with the first file system of the first data server to retrieve the particular file therefrom;
determining a file type for the particular file;
generating a set of encoding information based upon the file type of the particular file, wherein the set of encoding information comprises information for causing the first client to execute a particular type of application to process the particular file; and
sending the particular file and the set of encoding information to the first client.

10. The method of claim 9, wherein sending the particular file and the set of encoding information comprises:
sending the particular file and the set of encoding information as an electronic mail file to the first client.

11. The method of claim 10, wherein the electronic mail file comprises Multipurpose Internet Mail Extension (MIME) information.

12. The method of claim 9, wherein determining a file type for the particular file comprises:
determining a file extension for the particular file; and
processing the file extension to determine a file type for the particular file.

13. The method of claim 12, wherein processing comprises:
determining a Multipurpose Internet Mail Extension (MIME) type for the file extension.

14. The method of claim 13, wherein the set of encoding information comprises the MIME type.

15. The method of claim 1, further comprising:
receiving a request from the first client to compress a particular file stored on the first data server;
invoking the first protocol interpreter to interact with the first file system of the first data server to retrieve the particular file therefrom;
compressing the particular file to derive a compressed version; and
invoking the first protocol interpreter to interact with the first file system of the first data server to cause the first file system to store the compressed version onto the first data server.

16. The method of claim 1, further comprising:
receiving a request from the first client to send a particular file stored on the first data server to a recipient;
invoking the first protocol interpreter to interact with the first file system of the first data server to retrieve the particular file therefrom; and
sending the particular file to the recipient without first downloading the particular file to the first client.

17. The method of claim 1, further comprising:
receiving a request from the first client to create a new directory on the first data server; and
invoking the first protocol interpreter to interact with the first file system of the first data server to cause the first file system to create the new directory on the first data server.

18. The method of claim 1, further comprising:
receiving a request from the first client to store a new file onto the first data server;
receiving the new file from the first client; and
invoking the first protocol interpreter to interact with the first file system of the first data server to cause the first file system to store the new file onto the first data server.

19. The method of claim 1, further comprising:
receiving a search request from the first client comprising a set of search criteria;

processing the set of search criteria to derive one or more search commands;

invoking the first protocol interpreter to interact with the first file system of the first data server to cause the first file system to implement the one or more search commands; and receiving one or more sets of search results from the first file system.

20. The method of claim 19, further comprising:

processing the one or more sets of search results to derive a processed set of search results; and sending the processed set of search results to the first client.

21. The method of claim 19, wherein the set of search criteria comprises a Boolean operation and/or a wild card.

22. An apparatus, comprising:

a mechanism for receiving a request from a first client to browse contents of a first file system on a first data server, wherein the first data server implements the first file system for managing file access and storage, and wherein the first client is unaware that the first data server implements the first file system;

a mechanism for selecting a first protocol interpreter from a plurality of different protocol interpreters, wherein the first protocol interpreter implements a first file access protocol which enables interaction with the first file system;

a mechanism for invoking the first protocol interpreter to interact with the first file system of the first data sever to obtain therefrom a first list of contents, wherein the first list of contents sets forth a hierarchical listing of at least a portion of the contents of the first file system on the first data server, the first list of contents comprising one or more directories and zero or more files; and a mechanism for sending at least a portion of the first list of contents to the first client.

23. The apparatus of claim 22, wherein the first client executes a web browser and submits the request using the web browser.

24. The apparatus of claim 22, wherein the first client does not implement the first file access protocol such that the first client is incapable of interacting directly with the first file system.

25. The apparatus of claim 22, further comprising:

a mechanism for receiving a request from the first client to browse contents of a second file system on a second data server, wherein the second data server implements the second file system, different from the first file system, for managing file access and storage, and wherein the first client is unaware that the second data server implements the second file system;

a mechanism for selecting a second protocol interpreter from the plurality of different protocol interpreters, wherein the second protocol interpreter implements a second file access protocol which enables interaction with the second file system;

a mechanism for invoking the second protocol interpreter to interact with the second file system of the second data sever to obtain therefrom a second list of contents, wherein the second list of contents sets forth a hierarchical listing of at least a portion of the contents of the second file system on the second data server, the second list of contents comprising one or more directories and zero or more files; and a mechanism for sending at least a portion of the second list of contents to the second client.

26. The apparatus of claim 25, wherein the first client does not implement the second file access protocol such that the first client is incapable of interacting directly with the second file system.

27. The apparatus of claim 22, further comprising:

a mechanism for receiving a request from a second client to browse contents of a second file system on a second data server, wherein the second data server implements the second file system, different from the first file system, for managing file access and storage, and wherein the second client is unaware that the second data server implements the second file system;

a mechanism for selecting a second protocol interpreter from the plurality of different protocol interpreters, wherein the second protocol interpreter implements a second file access protocol which enables interaction with the second file system;

a mechanism for invoking the second protocol interpreter to interact with the second file system of the second data sever to obtain therefrom a second list of contents, wherein the second list of contents sets forth a hierarchical listing of at least a portion of the contents of the second file system on the second data server, the second list of contents comprising one or more directories and zero or more files; and a mechanism for sending at least a portion of the second list of contents to the second client.

28. The apparatus of claim 27, wherein the second client does not implement the second file access protocol such that the second client is incapable of interacting directly with the second file system.

29. The apparatus of claim 22, further comprising:

a mechanism for receiving a request from the first client to further explore a particular directory on the first data server;

a mechanism for invoking the first protocol interpreter to interact with the first file system of the first data sever to obtain therefrom a second list of contents, wherein the second list of contents comprises zero or more directories and one or more files stored within the particular directory; and a mechanism for sending at least a portion of the second list of contents to the first client.

30. The apparatus of claim 22, further comprising:

a mechanism for receiving a request from the first client to access a particular file stored on the first data server;

a mechanism for invoking the first protocol interpreter to interact with the first file system of the first data server to retrieve the particular file therefrom;

a mechanism for determining a file type for the particular file;

a mechanism for generating a set of encoding information based upon the file type of the particular file, wherein the set of encoding information comprises information for causing the first client to execute a particular type of application to process the particular file; and a mechanism for sending the particular file and the set of encoding information to the first client.

31. The apparatus of claim 30, wherein the mechanism for sending the particular file and the set of encoding information comprises:

a mechanism for sending the particular file and the set of encoding information as an electronic mail file to the first client.

32. The apparatus of claim 31, wherein the electronic mail file comprises Multipurpose Internet Mail Extension (MIME) information.

33. The apparatus of claim 30, wherein the mechanism for determining a file type for the particular file comprises:
  a mechanism for determining a file extension for the particular file; and
  a mechanism for processing the file extension to determine a file type for the particular file.

34. The apparatus of claim 33, wherein the mechanism for processing comprises:
  a mechanism for determining a Multipurpose Internet Mail Extension (MIME) type for the file extension.

35. The apparatus of claim 34, wherein the set of encoding information comprises the MIME type.

36. The apparatus of claim 22, further comprising:
  a mechanism for receiving a request from the first client to compress a particular file stored on the first data server;
  a mechanism for invoking the first protocol interpreter to interact with the first file system of the first data server to retrieve the particular file therefrom;
  a mechanism for compressing the particular file to derive a compressed version; and
  a mechanism for invoking the first protocol interpreter to interact with the first file system of the first data server to cause the first file system to store the compressed version onto the first data server.

37. The apparatus of claim 22, further comprising:
  a mechanism for receiving a request from the first client to send a particular file stored on the first data server to a recipient;
  a mechanism for invoking the first protocol interpreter to interact with the first file system of the first data server to retrieve the particular file therefrom; and
  a mechanism for sending the particular file to the recipient without first downloading the particular file to the first client.

38. The apparatus of claim 22, further comprising:
  a mechanism for receiving a request from the first client to create a new directory on the first data server; and
  a mechanism for invoking the first protocol interpreter to interact with the first file system of the first data server to cause the first file system to create the new directory on the first data server.

39. The apparatus of claim 22, further comprising:
  a mechanism for receiving a request from the first client to store a new file onto the first data server;
  a mechanism for receiving the new file from the first client; and
  a mechanism for invoking the first protocol interpreter to interact with the first file system of the first data server to cause the first file system to store the new file onto the first data server.

40. The apparatus of claim 22, further comprising:
  a mechanism for receiving a search request from the first client comprising a set of search criteria;
  a mechanism for processing the set of search criteria to derive one or more search commands;
  a mechanism for invoking the first protocol interpreter to interact with the first file system of the first data server to cause the first file system to implement the one or more search commands; and
  a mechanism for receiving one or more sets of search results from the first file system.

41. The apparatus of claim 40, further comprising:
  a mechanism for processing the one or more sets of search results to derive a processed set of search results; and
  a mechanism for sending the processed set of search results to the first client.

42. The apparatus of claim 40, wherein the set of search criteria comprises a Boolean operation and/or a wild card.

43. A computer readable medium, comprising:
  instructions for causing one or more processors to receive a request from a first client to browse contents of a first file system on a first data server, wherein the first data server implements the first file system for managing file access and storage, and wherein the first client is unaware that the first data server implements the first file system;
  instructions for causing one or more processors to select a first protocol interpreter from a plurality of different protocol interpreters, wherein the first protocol interpreter implements a first file access protocol which enables interaction with the first file system;
  instructions for causing one or more processors to invoke the first protocol interpreter to interact with the first file system of the first data sever to obtain therefrom a first list of contents, wherein the first list of contents sets forth a hierarchical listing of at least a portion of the contents of the first file system on the first data server, the first list of contents comprising one or more directories and zero or more files; and
  instructions for causing one or more processors to send at least a portion of the first list of contents to the first client.

44. The computer readable medium of claim 43, wherein the first client executes a web browser and submits the request using the web browser.

45. The computer readable medium of claim 43, wherein the first client does not implement the first file access protocol such that the first client is incapable of interacting directly with the first file system.

46. The computer readable medium of claim 43, further comprising:
  instructions for causing one or more processors to receive a request from the first client to browse contents of a second file system on a second data server, wherein the second data server implements the second file system, different from the first file system, for managing file access and storage, and wherein the first client is unaware that the second data server implements the second file system;
  instructions for causing one or more processors to select a second protocol interpreter from the plurality of different protocol interpreters, wherein the second protocol interpreter implements a second file access protocol which enables interaction with the second file system;
  instructions for causing one or more processors to invoke the second protocol interpreter to interact with the second file system of the second data sever to obtain therefrom a second list of contents, wherein the second list of contents sets forth a hierarchical listing of at least a portion of the contents of the second file system on the second data server, the second list of contents comprising one or more directories and zero or more files; and
  instructions for causing one or more processors to send at least a portion of the second list of contents to the first client.

47. The computer readable medium of claim 46, wherein the first client does not implement the second file access protocol such that the first client is incapable of interacting directly with the second file system.

48. The computer readable medium of claim 43, further comprising:

instructions for causing one or more processors to receive a request from a second client to browse contents of a second file system on a second data server, wherein the second data server implements the second file system, different from the first file system, for managing file access and storage, and wherein the second client is unaware that the second data server implements the second file system;

instructions for causing one or more processors to select a second protocol interpreter from the plurality of different protocol interpreters, wherein the second protocol interpreter implements a second file access protocol which enables interaction with the second file system;

instructions for causing one or more processors to invoke the second protocol interpreter to interact with the second file system of the second data sever to obtain therefrom a second list of contents, wherein the second list of contents sets forth a hierarchical listing of at least a portion of the contents of the second file system on the second data server, the second list of contents comprising one or more directories and zero or more files; and instructions for causing one or more processors to send at least a portion of the second list of contents to the second client.

49. The computer readable medium of claim 48, wherein the second client does not implement the second file access protocol such that the second client is incapable of interacting directly with the second file system.

50. The computer readable medium of claim 43, further comprising:

instructions for causing one or more processors to receive a request from the first client to further explore a particular directory on the first data server;

instructions for causing one or more processors to invoke the first protocol interpreter to interact with the first file system of the first data sever to obtain therefrom a second list of contents, wherein the second list of contents comprises zero or more directories and one or more files stored within the particular directory; and instructions for causing one or more processors to send at least a portion of the second list of contents to the first client.

51. The computer readable medium of claim 43, further comprising:

instructions for causing one or more processors to receive a request from the first client to access a particular file stored on the first data server;

instructions for causing one or more processors to invoke the first protocol interpreter to interact with the first file system of the first data server to retrieve the particular file therefrom;

instructions for causing one or more processors to determine a file type for the particular file;

instructions for causing one or more processors to generate a set of encoding information based upon the file type of the particular file, wherein the set of encoding information comprises information for causing the first client to execute a particular type of application to process the particular file; and instructions for causing one or more processors to send the particular file and the set of encoding information to the first client.

52. The computer readable medium of claim 51, wherein the instructions for causing one or more processors to send the particular file and the set of encoding information comprises:

instructions for causing one or more processors to send the particular file and the set of encoding information as an electronic mail file to the first client.

53. The computer readable medium of claim 52, wherein the electronic mail file comprises Multipurpose Internet Mail Extension (MIME) information.

54. The computer readable medium of claim 51, wherein the instructions for causing one or more processors to determine a file type for the particular file comprises:

instructions for causing one or more processors to determine a file extension for the particular file; and instructions for causing one or more processors to process the file extension to determine a file type for the particular file.

55. The computer readable medium of claim 54, wherein the instructions for causing one or more processors to process comprises:

instructions for causing one or more processors to determine a Multipurpose Internet Mail Extension (MIME) type for the file extension.

56. The computer readable medium of claim 55, wherein the set of encoding information comprises the MIME type.

57. The computer readable medium of claim 43, further comprising:

instructions for causing one or more processors to receive a request from the first client to compress a particular file stored on the first data server;

instructions for causing one or more processors to invoke the first protocol interpreter to interact with the first file system of the first data server to retrieve the particular file therefrom;

instructions for causing one or more processors to compress the particular file to derive a compressed version; and instructions for causing one or more processors to invoke the first protocol interpreter to interact with the first file system of the first data server to cause the first file system to store the compressed version onto the first data server.

58. The computer readable medium of claim 43, further comprising:

instructions for causing one or more processors to receive a request from the first client to send a particular file stored on the first data server to a recipient;

instructions for causing one or more processors to invoke the first protocol interpreter to interact with the first file system of the first data server to retrieve the particular file therefrom; and instructions for causing one or more processors to send the particular file to the recipient without first downloading the particular file to the first client.

59. The computer readable medium of claim 43, further comprising:

instructions for causing one or more processors to receive a request from the first client to create a new directory on the first data server; and instructions for causing one or more processors to invoke the first protocol interpreter to interact with the first file system of the first data server to cause the first file system to create the new directory on the first data server.

60. The computer readable medium of claim 43, further comprising:

instructions for causing one or more processors to receive a request from the first client to store a new file onto the first data server;

instructions for causing one or more processors to receive the new file from the first client; and instructions for causing one or more processors to invoke the first protocol interpreter to interact with the first file system of the first data server to cause the first file system to store the new file onto the first data server.

61. The computer readable medium of claim 43, further comprising:

instructions for causing one or more processors to receive a search request from the first client comprising a set of search criteria;

instructions for causing one or more processors to process the set of search criteria to derive one or more search commands;

instructions for causing one or more processors to invoke the first protocol interpreter to interact with the first file system of the first data server to cause the first file system to implement the one or more search commands; and instructions for causing one or more processors to receive one or more sets of search results from the first file system.

62. The computer readable medium of claim 61, further comprising:

instructions for causing one or more processors to process the one or more sets of search results to derive a processed set of search results; and instructions for causing one or more processors to send the processed set of search results to the first client.

63. The computer readable medium of claim 61, wherein the set of search criteria comprises a Boolean operation and/or a wild card.

* * * * *